United States Patent [19]

Ohira et al.

[11] Patent Number: 5,675,570
[45] Date of Patent: Oct. 7, 1997

[54] OPTICAL DISC HAVING INDICATION PORTION

[75] Inventors: Hiroyuki Ohira; Nobuki Yamaoka; Yutaka Murakami, all of Yamanashi-ken, Japan

[73] Assignees: Pioneer Electronic Corporation, Tokyo-to; Pioneer Video Corporation, Yamanashi-ken, both of Japan

[21] Appl. No.: 575,081

[22] Filed: Dec. 19, 1995

[30] Foreign Application Priority Data

Dec. 20, 1994 [JP] Japan .................. 6-335047

[51] Int. Cl.$^6$ .................. G11B 7/24; G11B 3/70
[52] U.S. Cl. .................. 369/275.1; 369/280
[58] Field of Search .................. 369/275.1, 14, 369/275.5, 275.4, 273, 281, 280, 283, 288, 272

[56] References Cited

U.S. PATENT DOCUMENTS

| | | | |
|---|---|---|---|
| 964,685 | 7/1910 | Owen | 369/280 |
| 1,033,909 | 7/1912 | Owen | 369/280 |
| 4,066,268 | 1/1978 | Borchard et al. | 369/280 |
| 4,967,286 | 10/1990 | Nomura et al. | 358/342 |
| 5,363,255 | 11/1994 | Ivers et al. | 369/14 |
| 5,398,231 | 3/1995 | Shin et al. | 369/275.4 |
| 5,410,142 | 4/1995 | Tsuboi et al. | 369/275.1 |
| 5,608,718 | 3/1997 | Schiewe | 369/275.4 |

FOREIGN PATENT DOCUMENTS 58-100235  6/1983  Japan .................. 369/275.1

*Primary Examiner*—Tan Dinh
*Attorney, Agent, or Firm*—Morgan, Lewis and Bockius, LLP

[57] ABSTRACT

An optical disc is provided with: a disc substrate of light transmissive type having an information record surface including an information recorded region, where pits or grooves carrying an information signal are coaxially or spirally formed, and an information not-recorded region, where the pits or grooves carrying the information signal are not formed; a light reflective layer wholly disposed on the information record surface in the information recorded region, and partially disposed on the information record surface in the information not-recorded region such that an indication pattern is formed of the partially disposed light reflective layer on the information record surface in the information not-recorded region; and a protection layer disposed on the light reflective layer and a portion of the information record surface in the information not-recorded region where the light reflective layer is not disposed.

7 Claims, 3 Drawing Sheets

OPTICAL DISC HAVING INDICATION PORTION

BACKGROUND OF THE INVENTION

1. Field of the Invention

The present invention generally relates to an optical disc, and more particularly to an optical disc, on which an indication of visible information is provided at the disc surface.

2. Description of the Related Art

An optical disc, e.g. a video disc and a digital audio disc, has such a construction that fine concave and convex portions, which are so-called as "pits" to carry the information signal, are coaxially or spirally formed along a predetermined signal track at one surface (i.e. an information record surface) of a resin substrate of light transmissive type and are covered with a light reflective layer, and that the information signal of the pits are optically reproduced by irradiating the optical disc with a reading light beam from the other surface of the resin substrate.

There is a method of providing a visible information onto the disc surface of the optical disc of this type, in related arts e.g. Japanese Patent Laid Open NO. Sho 58-100235. In this related art, characters, marks, the number etc. of the optical disc are recorded, as the indication portion on the disc surface, in the information not-recorded region, which is located at the inner circumferential area of the disc surface.

During the step of light-exposing a glass original disc coated with photo-resist by a light beam which is modulated in accordance with the information signal to make the information recorded region, those characters, marks etc., are formed by light-exposing the information not-recorded region at the inner circumferential area of the disc surface by the light beam which is modulated in accordance with the characters, marks etc. to be indicated. This light-exposed glass original disc is developed. Then, a stamper is formed by nickel-electric-molding the developed disc. The composite resin of light transmissive type is injection-molded by use of this stamper. Finally, the light reflective layer and the protection layer are successively formed on the formed composite resin substrate, so that the optical disc is produced. The characters, the marks, etc. are indicated as the shapes of the portions where the pits or grooves exist.

However, the indication portion of such characters, marks, etc., are visible by the light diffraction, the light interference, the light scattering of the light as the shapes of the portions where the pits or grooves exist, relative to the portions where the pits or grooves do not exist (i.e. the mirror finished surface). Thus, the contrast (i.e. the difference in the light intensity of the light sensed by a human eye) is rather little, and the indication clearness runs short, which is the problem. Further, the indication portion is the information not-recorded portion of the optical disc at the inner circumferential area thereof, the size of the indication portion is limited and rather small, so that it is difficult to visually recognize the content of the indication portion if a large amount of information is formed to be indicated. Furthermore, it is also difficult to make an indication of a picture or drawing in the indication portion.

SUMMARY OF THE INVENTION

It is therefore an object of the present invention to provide an optical disc having an indication portion and a method of forming such an indication portion of the optical disc, which can improve the contrast of the indication portion of the disc surface.

The above object of the present invention can be achieved by a first optical disc provided with: a disc substrate of light transmissive type having an information record surface including an information recorded region, where pits or grooves carrying an information signal are coaxially or spirally formed, and an information not-recorded region, where the pits or grooves carrying the information signal are not formed; a light reflective layer wholly disposed on the information record surface in the information recorded region, and partially disposed on the information record surface in the information not-recorded region such that an indication pattern is formed of the partially disposed light reflective layer on the information record surface in the information not-recorded region; and a protection layer disposed on the light reflective layer and a portion of the information record surface in the information not-recorded region where the light reflective layer is not disposed.

According to the first optical disc of the present invention, a disc substrate of light transmissive type has an information record surface including an information recorded region, where pits or grooves carrying an information signal are coaxially or spirally formed, and an information not-recorded region, where the pits or grooves carrying the information signal are not formed. A light reflective layer is wholly disposed on the information record surface in the information recorded region, and partially disposed on the information record surface in the information not-recorded region such that an indication pattern is formed of the partially disposed light reflective layer on the information record surface in the information not-recorded region. A protection layer is disposed on the light reflective layer and a portion of the information record surface in the information not-recorded region where the light reflective layer is not disposed. Accordingly, since the indication pattern is formed by the existence and non-existence of the light reflective layer in the information not-recorded region, the contrast of the indication pattern is quite high.

In one aspect of the first optical disc of the present invention, pits or grooves carrying a dummy signal are coaxially or spirally formed on the information record surface in the information not-recorded region. In this case, by the light diffraction, light interference, light scattering etc. of the light due to the pits or grooves which are coaxially or spirally formed and carry the dummy signal, the indication portion can be seen in rainbow color etc., to improve the visual effect of the indication portion. On the other hand, a highly contrasty indication portion can be obtained by leaving the information not recorded region in the mirror finished surface condition without forming the pits or grooves carrying the dummy signal.

As another aspect of the first optical disc of the present invention, the information recorded region is located at an inner circumferential side of the information not-recorded region. In this case, by recording the information signal from the inner circumferential side toward the outer circumferential side of the optical disc, a relatively large indication portion can be formed by use of the information not-recorded region located at the vicinity of the outer circumferential side of the optical disc.

As another aspect of the first optical disc of the present invention, the disc substrate comprises resin, and the light reflective layer comprises metal. In this case, a high contrast of the indication portion can be obtained by virtue of the difference in optical properties between the resin and the metal.

The above object of the present invention can be also achieved by a second optical disc provided with a first disc body, a second disc body which are coaxially disposed, and a bonding layer interposed between the first and second disc bodies for bonding the first and second disc bodies to each other. The first disc body is provided with: a first disc substrate of light transmissive type having a first information record surface including an information not-recorded region, where pits or grooves carrying the information signal are not formed; a first light reflective layer partially disposed on the first information record surface in the information not-recorded region such that an indication pattern is formed of the partially disposed first light reflective layer on the first information record surface in the information not-recorded region; and a first protection layer disposed on the first light reflective layer and a portion of the first information record surface in the information not-recorded region where the first light reflective layer is not formed. The second disc body is provided with: a second disc substrate of light transmissive type having a second information record surface including an information recorded region, where the pits or grooves carrying the information signal are coaxially or spirally disposed; a second light reflective layer wholly disposed on the second information record surface in the information recorded region; and a second protection layer disposed on the second light reflective layer. The first and second disc bodies are bonded by the bonding layer such that the first and second protection layers are opposed to each other.

According to the second optical disc of the present invention, since the indication pattern is formed by the existence and non-existence of the light reflective layer in the information not-recorded region of the first disc body which is used exclusively for indicating the indication pattern, and since the second disc body is exclusively used for recording the information signal, the contrast of the indication pattern is quite high. At the same time, the size of the indication pattern can be made quite large at the side of the first disc body of the second optical disc.

In one aspect of the second optical disc of the present invention, pits or grooves carrying a dummy signal are coaxially or spirally formed on the information record surface in the information not-recorded region. Thus, the indication portion can be seen in rainbow color etc., to improve the visual effect of the indication portion.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

First Embodiment

Figure 1:
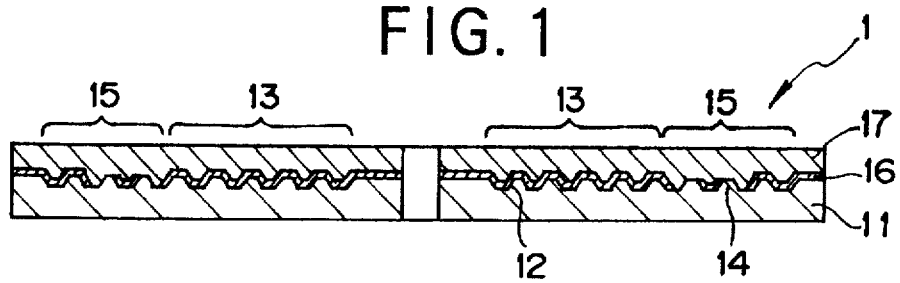
FIG. 1 is a cross sectional view of an optical disc as a first embodiment of the present invention.

FIG. 1 is a cross sectional view of a first embodiment of the present invention.

In FIG. 1, an optical disc 1 is provided with a disc substrate 11 of light transmissive type, which comprises composite resin such as polymethylmethacrylate, polycarbonate, etc. The disc substrate 11 has an information recorded region 13, on which pits or grooves 12 for carrying an information signal are coaxially or spirally formed at one surface (i.e. an information record surface) thereof, and an information not-recorded region 15, where pits or grooves 14 for carrying a dummy signal are coaxially or spirally formed on the information record surface. The optical disc 1 is also provided with a light reflective layer 16. The light reflective layer 16 made of metal thin film comprising aluminum, aluminum alloy, gold, etc., is formed wholly on the information recorded region 13. On the contrary, the light reflective layer 16 is formed only partially on the information not-recorded region 15. Namely, on the information not-recorded region 15, the indication portion is formed by the pattern of the portion where the light reflective layer 16 is not formed or by the pattern of the portion where the light reflective layer 16 is formed. The optical disc 1 is further provided with a protection layer 17, which is made from resin of the ultra-violet ray hardening type, and is formed on the upper surface of the light reflective layer 16 and the upper surface of the disc substrate 11 where the light reflective layer 16 is not formed.

Figure 2:
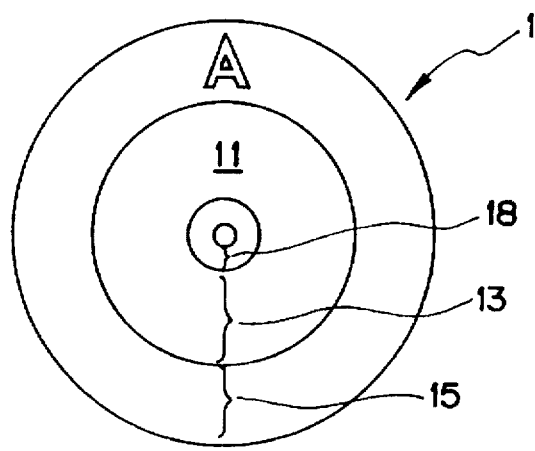
FIG. 2 is a plane view of the optical disc of FIG. 1.

FIG. 2 is a surface plane view of the optical disc 1 of FIG. 1, from the side of the disc substrate 11.

In FIG. 2, the information signal is recorded from the inner circumferential side toward the outer circumferential side of the optical disc 1. If there is only little amount of the information to be recorded, a relatively large empty region (i.e. the information not-recorded region) remains. In such a case, a large enough indication portion can be formed by use of the information not-recorded region at the outer circumferential area of the optical disc 1 as shown in FIG. 2. In FIG. 2, the character "A" is indicated in the information not-recorded region 15 by the indication portion as the pattern of the light reflective layer 16 on the substrate 11. In addition, if there is a large amount of information to be recorded so that the outer empty space is rather narrow, the indication portion may be formed in an information not-recorded region 18 at the inner circumferential area of the optical disc 1. Further, it is possible to improve the visual effect in such a manner that the indication portion can be visually rainbow-colored due to the light diffraction, the light interference, the light scattering, etc., by forming coaxially or spirally the pits or grooves 14 carrying the dummy signal at the information not-recorded regions 15 and/or 18 of the disc substrate 11. It goes without saying that a highly contrasty indication portion can be obtained by leaving the information not recorded regions 15 and/or 18 of the disc substrate 11 in the mirror finished surface condition without forming the pits or grooves 14 carrying the dummy signal thereat.

Nextly, the method of producing the optical disc 1 will be explained with referring to FIG. 3.

Figure 3A:
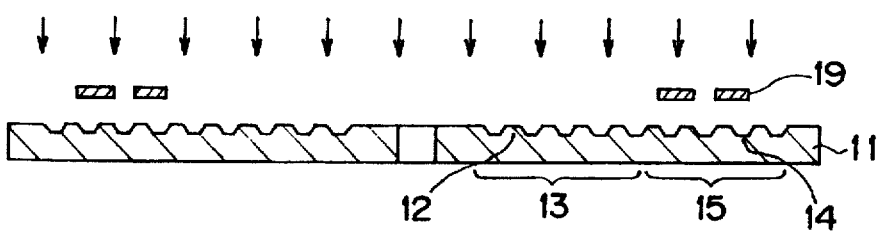
FIG. 3, which consist of FIGS. 3A to 3C, are diagrams showing the process of forming the indication portion of the optical disc of FIG. 1.

As shown in FIG. 3A, the disc substrate 11 is prepared which is made from composite resin and which has the information recorded region 13, where the pits or grooves 12 carrying the information signal are coaxially or spirally formed, and the information not-recorded region 15, where the pits or grooves 14 carrying the dummy signal are coaxially or spirally formed, on one surface (i.e. the information record surface) of the disc substrate 11. A mask 19, which has an aperture corresponding to the indication pattern of the characters, the marks, the graphics etc. to be indicated, is disposed over the information not-recorded region 15 of the disc substrate 11. Then, metal such as aluminum, aluminum alloy, gold etc., is deposited through the mask 19 onto the information record surface of the disc substrate 11 by means of vapor deposition or sputtering technique.

Figure 3B:
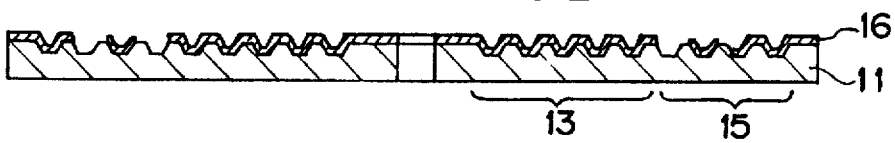

As shown in FIG. 3B, the light reflective layer 16 made of metal thin film is formed wholly on the surface of the information recorded region 13. On the contrary, the light reflective layer 16 is partially formed on the surface of the information not-recorded region 15 in correspondence with the indication pattern of the mask 19.

Figure 3C:
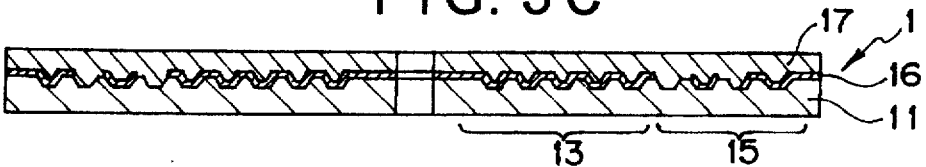

Then, as shown in FIG. 3C, the ultra-violet ray hardening type resin is spinner-coated and the protection layer 17 is formed on the light reflective layer 16 and at a portion of the disc substrate 11 where the light reflective layer 16 is not formed, so that the optical disc 1 of the present embodiment is produced.

Second Embodiment

Figure 4:
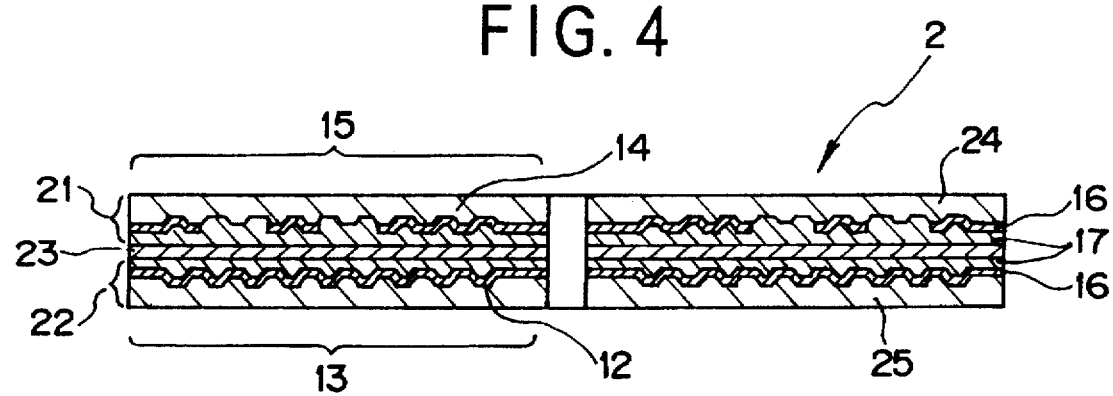
FIG. 4 is a cross sectional view of an optical disc as a second embodiment of the present invention.

FIG. 4 is a cross sectional view of a second embodiment of the present invention.

In FIG. 4, an optical disc 2 is provided with two disc bodies 21 and 22, each of which is single side recording and reproducing type and which are bonded together through bonding agent layer 23 of hot melt type, in such a manner that the protection layers 17 and 17 are opposed to each other. The disc body 21 is provided with a disc substrate 24 of light transmissive type, which comprises composite resin such as polymethylmethacrylate, polycarbonate, etc. All over the information not-recorded region 15 of the disc substrate 24, the pits or grooves 14 for carrying the dummy signal are coaxially or spirally formed. Namely, the pits or grooves 12 for carrying the information signal are not formed at all on the disc body 21. The disc body 21 is also provided with the light reflective layer 16. The light reflective layer 16 made of metal thin film is only partially formed on the surface of the disc substrate 24 in accordance with the indication pattern such as characters, marks, graphics, etc. Namely, the indication portion is formed by the pattern of the portion where the light reflective layer 16 is not formed or by the pattern of the portion where the light reflective layer 16 is formed, on the disc body 21. The disc body 21 is further provided with the protection layer 17, which is made from resin of the ultra-violet ray hardening type, and is formed on the light reflective layer 16 and the disc substrate 24 where the light reflective layer 16 is not formed.

On the other hand, the disc body 22 is provided with a disc substrate 25 of light transmissive type, which comprises composite resin such as polymethylmethacrylate, polycarbonate, etc. On the disc substrate 25, the pits or grooves 12 for carrying the information signal are coaxially or spirally formed at the information record surface 13 thereof. The disc body 22 is also provided with the light reflective layer 16. The light reflective layer 16 made of metal thin film is formed wholly on the information recorded region 13 of the disc substrate 25. The disc body 22 is further provided with the protection layer 17, which is made from resin of the ultra-violet ray hardening type, and is formed on the light reflective layer 16.

Figure 5:
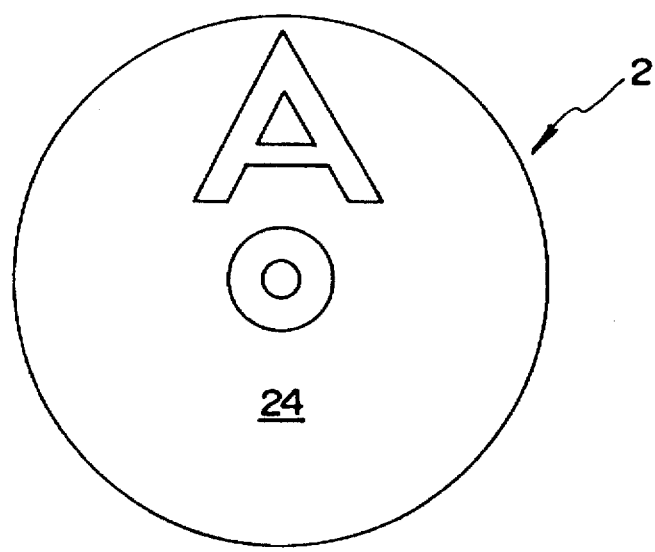
FIG. 5 is a plane view of the optical disc of FIG. 4.

In this manner, while the first embodiment is constructed as an optical disc of single substrate type and single side recording and reproducing type, the second embodiment is constructed as an optical disc of double substrate type and single side recording and reproducing type, in which the information signal is recorded to only one of the two surfaces of the optical disc. The indication portion is exclusively formed onto the disc body 21, to which the information signal is not recorded, by the pattern of the portion where the light reflective layer 16 is not formed or by the pattern of the portion where the light reflective layer 16 is formed as shown in FIG. 5. Namely, since the whole one surface of the disc body 21 is exclusively used for the indication portion, a large sized indication portion, which indicates "A" as shown in FIG. 2, can be obtained and, for example, a picture or drawing can be indicated by use of this indication portion. It goes without saying that a highly contrasty indication portion can be achieved by leaving the information record surface of the disc substrate 24 in the mirror finished surface condition without forming the pits or grooves 14 carrying the dummy signal.

Third Embodiment

Figure 6:
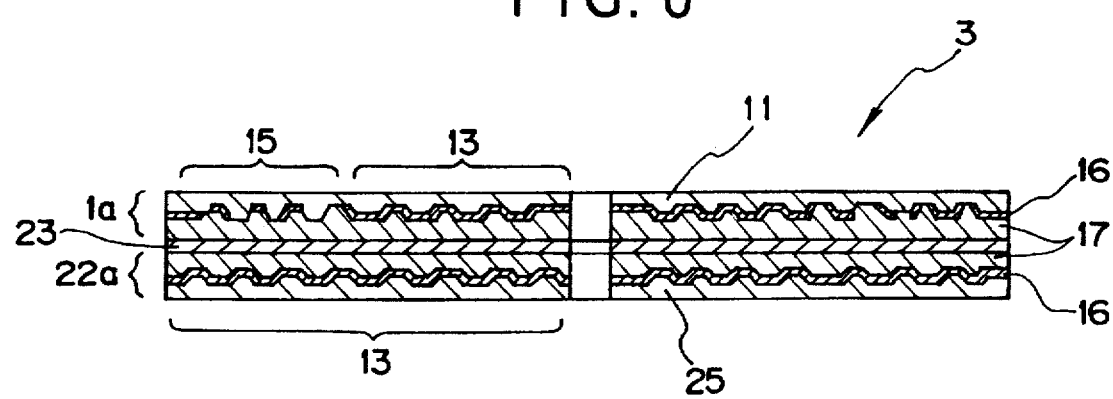
FIG. 6 is a cross sectional view of an optical disc as a third embodiment of the present invention.

FIG. 6 is a cross sectional view of a third embodiment of the present invention.

In FIG. 6, an optical disc 3 is provided with two disc bodies 1a and 22a, each of which is single side recording and reproducing type and which are bonded together through bonding agent layer 23 of hot melt type, in such a manner that the protection layers 17 and 17 are opposed to each other. The disc body 1a has the same construction as the optical disc 1 of the first embodiment of FIG. 1. The disc bodies 22a has the same construction as the disc body 22 of the second embodiment of FIG. 4.

Thus, while the first embodiment is constructed as an optical disc of single substrate type and single side recording and reproducing type, the third embodiment is constructed as an optical disc of double substrate type and both side recording and reproducing type, in which the information signal is recorded to both of the two surfaces of the optical disc 3. The indication portion is formed onto the disc body 1a at the information not-recorded portion, by the pattern of the portion where the light reflective layer 16 is not formed or by the pattern of the portion where the light reflective layer 16 is formed. Accordingly, the amount of information signals can be significantly large as compared with the first and second embodiments. It goes without saying that a highly contrasty indication portion can be achieved by leaving the information record surface of the disc substrate 11 in the information not-recorded region 15 in the mirror finished surface condition without forming the pits or grooves 14 carrying the dummy signal.

Fourth Embodiment

Figure 7:
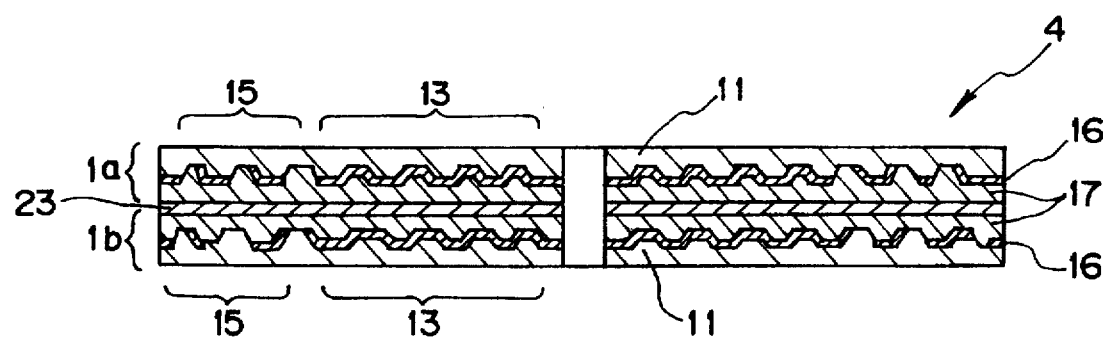
FIG. 7 is a cross sectional view of an optical disc as a fourth embodiment of the present invention.

FIG. 7 is a cross sectional view of a fourth embodiment of the present invention.

In FIG. 7, an optical disc 4 is provided with two disc bodies 1a and 1b, each of which is single side recording and reproducing type and which are bonded together through bonding agent layer 23 of hot melt type, in such a manner that the protection layers 17 and 17 are opposed to each other. Each of the disc bodies 1a and 1b has the same construction as the optical disc 1 of the first embodiment of FIG. 1.

Thus, while the first embodiment is constructed as an optical disc of single substrate type and single side recording and reproducing type, the fourth embodiment is constructed as an optical disc of double substrate type and both side recording and reproducing type, in which the information signal is recorded to both of the two surfaces of the optical disc 4. The indication portion is formed onto each of the disc bodies 1a and 1b at the information not-recorded portions respectively, by the pattern of the portion where the light reflective layer 16 is not formed or by the pattern of the portion where the light reflective layer 16 is formed. It goes without saying that a highly contrasty indication portion can be achieved by leaving the information record surface in the information not-recorded region 15 of the disc body 1a and/or 1b in the mirror finished surface condition without forming the pits or grooves 14 carrying the dummy signal.

As described above in detail, since the indication pattern is formed by the existence and non-existence of the light reflective layer 16 in the information not-recorded region, the contrast, the clearness and the distinctness of the indication pattern is quite highly improved according to the present embodiments. Especially, according to the second embodiment, since one disc surface is exclusively used for indicating the indication pattern, the indication portion of large size is realized as shown in FIG. 5. Especially, according to the third and fourth embodiments, since both side recording and reproducing operation is available, the information signal of large volume can be recorded and reproduced, while the contrast, the clearness and the distinctness of the indication pattern is high.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disc comprising:
   a disc substrate of light transmissive type having an information record surface including an information recorded region, where pits or grooves carrying an information signal are coaxially or spirally formed, and an information not-recorded region, where said pits or grooves carrying the information signal are not formed;
   a light reflective layer wholly disposed on the information record surface in the information recorded region, and partially disposed on the information record surface in the information not-recorded region in order to form an indication pattern on said information record surface in the information not-recorded region; and
   a protection layer disposed on said light reflective layer and a portion of said information record surface in the information not-recorded region where said light reflective layer is not disposed.

2. An optical disc according to claim 1, wherein pits or grooves carrying a dummy signal are coaxially or spirally formed on said information record surface in said information not-recorded region.

3. An optical disc according to claim 1, wherein said information recorded region is located at an inner circumferential side of said information not-recorded region.

4. An optical disc according to claim 1, wherein said disc substrate comprises resin, and said light reflective layer comprises metal.

5. An optical disc comprising a first disc body, a second disc body which are coaxially disposed, and a bonding layer interposed between said first and second disc bodies for bonding said first and second disc bodies to each other, said first disc body comprising:
   a first disc substrate of light transmissive type having a first information record surface including an information not-recorded region, where pits or grooves carrying information signal are not formed;
   a first light reflective layer partially disposed on the first information record surface in the information not-recorded region in order to form an indication pattern on said first information record surface in the information not-recorded region; and
   a first protection layer disposed on said first light reflective layer and a portion of said first information record surface in the information not-recorded region where said first light reflective layer is not formed, said second disc body comprising:
   a second disc substrate of light transmissive type having a second information record surface including an information recorded region, where pits or grooves carrying the information signal are coaxially or spirally disposed;
   a second light reflective layer wholly disposed on the second information record surface in the information recorded region; and
   a second protection layer disposed on said second light reflective layer,
   said first and second disc bodies being bonded by said bonding layer such that said first and second protection layers are opposed to each other.

6. An optical disc according to claim 5, wherein pits or grooves carrying a dummy signal are coaxially or spirally formed on said first information record surface in said information not-recorded region.

7. An optical disc according to claim 5, wherein said first information record surface includes an information recorded region wholly covered with said first light reflective layer.

* * * * *